April 30, 1957    E. JAULMES    2,790,525
COMBINED CLUTCH AND EXPANDING PULLEY
Filed Nov. 30, 1954    2 Sheets-Sheet 1

INVENTOR
ERIC JAULMES
By Young, Emery & Thompson
ATTYS.

April 30, 1957   E. JAULMES   2,790,525
COMBINED CLUTCH AND EXPANDING PULLEY
Filed Nov. 30, 1954   2 Sheets-Sheet 2

INVENTOR
ERIC JAULMES
BY Young, Emery & Thompson
ATTYS.

United States Patent Office 2,790,525
Patented Apr. 30, 1957

2,790,525
COMBINED CLUTCH AND EXPANDING PULLEY

Eric Jaulmes, Paris, France, assignor to Ateliers de la Motobecane, Societe Anonyme Francaise Application November 30, 1954, Serial No. 472,173

Claims priority, application France June 18, 1954

2 Claims. (Cl. 192—3.5)

The present invention relates to light vehicles, particularly motorcycles, provided both with an automatic centrifugal clutch, for causing disconnection of the motor from the transmission when the speed of the vehicle falls below a certain predetermined value, and a variable-speed device, which is likewise automatic, and includes as its essential component an expanding pulley with centrifugal masses, on which a V belt is fitted.

This pulley is, in a known construction, composed of two truncated conical flanges, each cooperating with a set of centrifugal balls which engage against the external wall of the corresponding flange, and also against an outer plate.

The centrifugal clutch comprises, likewise in a known way, a plate which supports the mechanism and which has a positive rotary connection with the rear wheel through the transmission.

These two mechanisms, the clutch and the variable-speed device, are wholly independent from each other, except that they are both mounted on the output shaft of the motor.

Now, and precisely in the particular application to motorcycles, the weight and bulk must be reduced to every possible extent, and especially the bulk in the lateral direction, since it is important in all cases not to exceed the limiting width defined by the two vertical planes in which turn the cranks of the pedal mechanism which the motorcycles in question always include.

The object of the invention is essentially to produce a combination of the two mechanisms in question such that its lateral bulk will permit the assembly to be readily placed between the motor and the plane of the corresponding crank.

The production of certain parts common to both mechanisms also permits a considerable reduction in weight.

For this purpose, and according to the invention, the abutment plate for the outer set of balls, that is to say those situated opposite to the motor, is eliminated and replaced by the wall of the cage which forms part of the centrifugal clutch and which supports the mechanism.

Also, in the hub of the centrifugal clutch, an annular recess is provided, in which can move concentric cylindrical sleeves which guide the two flanges of the expanding pulley axially on the motor shaft in the course of their relative displacements.

The co-operation and interpenetration of the two mechanisms, which are brought about by the invention, appear clearly from the accompanying drawings, which show schematically one embodiment given simply by way of example.

Figure 1:
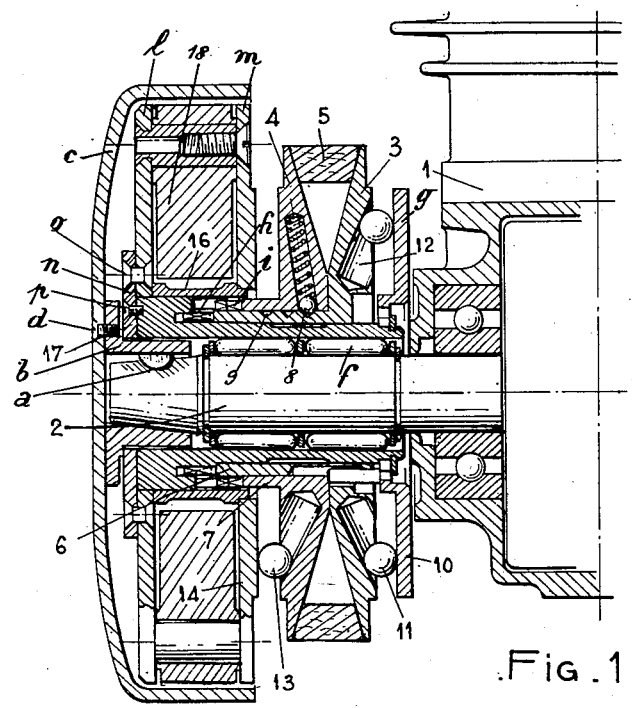
Figure 1 is a vertical sectional view showing the relative position of the components of the mechanism while the effective diameter of the expanding pulley is a maximum.
Figure 1A:
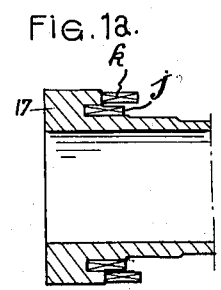
Figure 1a is a detail of one form of positive connection between the pulley and clutch.

The part of the motor adjacent to the device made according to the invention is indicated at 1. On the output shaft 2 of the motor are mounted the two truncated conical flanges 3, 4 of the expanding pulley, on which is fitted the V belt 5. The cylindrical sleeve 6 for guiding the flange 3 bears directly on the motor shaft 2. The cylindrical sleeve 7 for the flange 4 bears on the sleeve 6. In a known manner, a ball catch 8 working in notches 9 holds the diameter at which the belts fits the pulley at certain predetermined values. In a manner which is likewise known, the flat plate 10 forms an abutment for the balls 11 which are each housed in a small cavity 12, here formed by a simple cylindrical bore at a suitable inclination.

According to the invention, the normal abutment plate for the outer set of balls 13 is eliminated. It is the wall 14 itself of the cage 15 supporting the mechanism of the centrifugal clutch which fulfills its function. Not only is the bulk of the assembly thus reduced, but also, due to this arrangement, a simplification and lightening of the mechanism are brought about.

Figure 2:
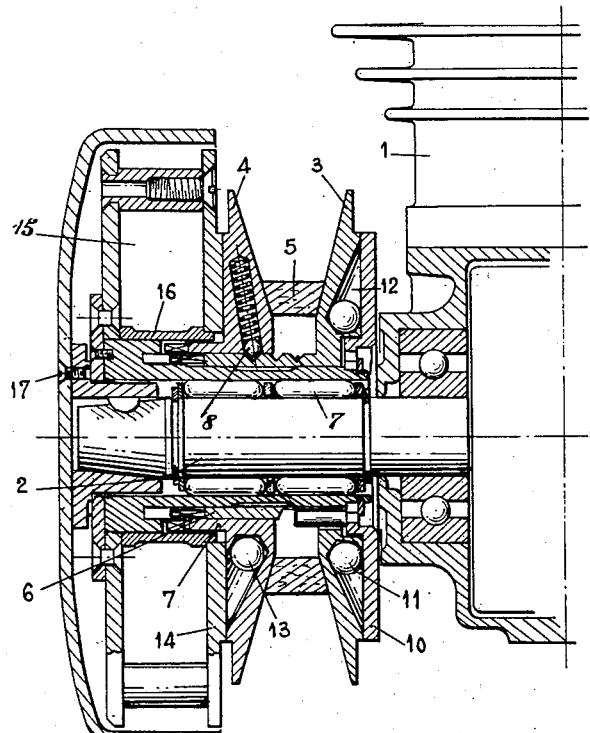
Figure 2 is a similar view showing the same components in the low-speed position.

In the final position of separation of the two flanges 3 and 4, shown in Figure 2, one bears against the plate 10 and the other against the wall 14.

In order to permit the lateral movement of the two flanges 3, 4, which corresponds to an axial movement of their respective supporting sleeves 6 and 7, and according to a further characteristic of the invention, the cage 15 of the centrifugal clutch is provided with a hub 16 centered by the collar 17, and forming around the shaft 2 an annular space in which said two sleeves 6 and 7 can move, as a comparison of Figures 1 and 2 clearly shows.

Figure 3:
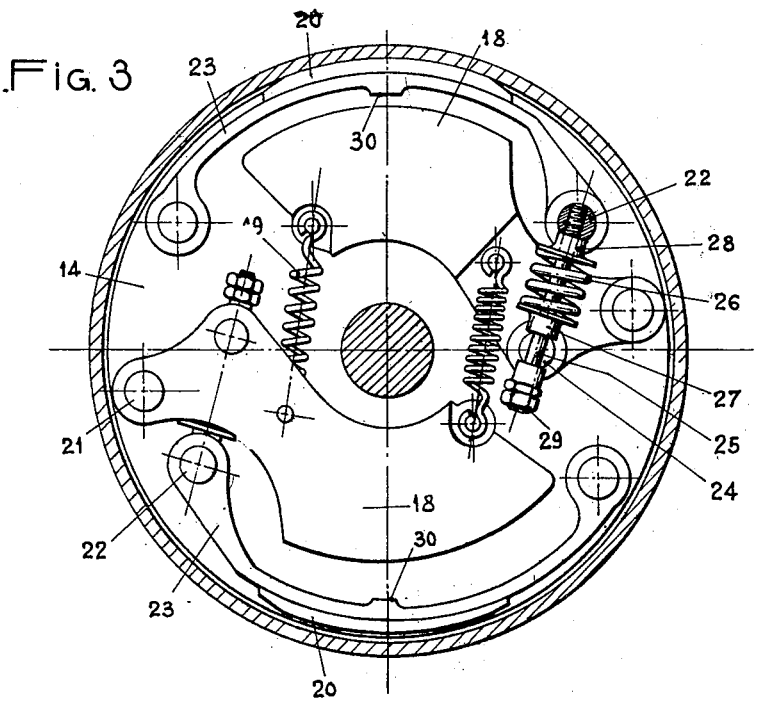
Figure 3 is a front view of the centrifugal clutch mechanism partly in section.

The separate and independent operation of the centrifugal clutch and of the expanding pulley are each known, but will be now repeated, for the sake of clarity (see Figure 3).

Once the motorcycle, and hence the wall 14, reaches a definite speed N such that the centrifugal forces which act on the weights 18 exceed the force of the springs 19, the latter allow the weights to separate. Their movement is transmitted to the linings 20 through the reduction provided by the relation of the lever arms, to which corresponds the distance between the pivots 21 and 22, so that the force with which the linings 20 are applied to the external drum of the clutch is very large for a slight movement of the weights. Thus, at a low speed of the cycle, a very effective engagement is obtained.

A key $a$ renders the motor shaft 2 integral with sleeve $b$. Drum $c$ is screwed on the sleeve by means of screw $d$ and turns with the motor shaft 2. The sleeve 17 is mounted on shaft 2 by the intermediary of rollers or needle bearings $f$. The plate 10 turns with the sleeve 17 with which it is rigidly connected. The two sleeves 6 and 7 rotate with the sleeve 17 because the splines or teeth at the ends $h$ and $i$ of the sleeves 6 and 7 are always in engagement with the splines or teeth $j$, $k$ on sleeve 17. The two plates $l$ and $m$, between which plates are mounted the weights 18 of the centrifugal clutch mechanism, are rigidly connected to the sleeve 17 by means of a disc $n$ attached to the plate $l$ by rivets $o$ and to the sleeve 17 by the screw $p$. A hub 16 of the clutch is assembled on sleeve 17 by a friction or press fit.

The drum $c$ rotates with the motor. The extensible pulley 3, 4 rotates with the rear wheel by the intermediary of the trapezoidal belt 5. The sleeve 17 and the sleeves 6 and 7 rotate together at the same time as the pulley 3, 4 due to the permanent engagement of the splines or teeth *h, i* of the sleeves 6, 7 with the splines or teeth *j, k* of the sleeve 17. The length of these splines or teeth is such that the two sleeves 6 and 7 remain constantly in engagement with the sleeve 17 no matter what the axial position of sleeve 17 is in relation to the two parts 3, 4 of the extensible pulley.

This position of the components corresponds to a low speed of the motor. If the rider accelerates the motor, the speed of rotation of the mechanism can reach very high values which could destroy the mechanism. To prevent this, the pivot 22 of the shoes 23 is not fixed directly to the weights 18. On each weight there is provided a socket 24 through which passes freely a rod 25 which is also engaged and fixed in another socket on the pivot 22. A strong coil spring 26 is compressed between two plates 27 and 28 carried by the rod 25, the force of this spring being variable by means of nuts 29. At rest, the springs 26 make the distance between the pivots 22 and 21 a maximum.

If the centrifugal force on the weights exceeds the force of the springs 26, for a given speed of rotation N', the latter are compressed and the weights come into contact with radial stops 30 provided on the inside of the shoes 23.

All the mechanism of the pivots and levers is then loaded by not more than the force of the springs 26, whatever the speed of rotation may be, since the weights 18 then rest directly against the external drum through the shoes 23, so that the multiplying effect of the lever arms ceases. The force of the springs 26 is chosen to be efficient to alone ensure engagement.

Figure 4:
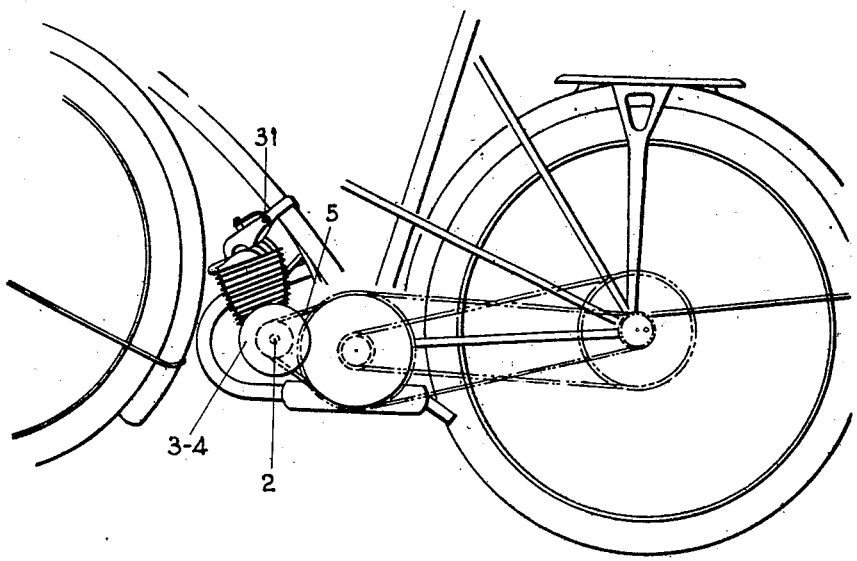
Figure 4 is a fragmentary view in elevation of a motorcycle equipped with the device according to the invention.

As to the operation of the described expanding pulley 3, 4, it will be sufficient to point out that the motor of the cycle is pivotally mounted at its top end on a fulcrum 31 carried by the frame (see Figure 4) and urged forwardly by a spring (not shown) which thus tends to reduce the operative diameter of the expanding pulley, and hence to slacken the speed of the cycle. But this effect is counteracted by the centrifugal force which tends to displace the balls 11 outwardly, and thus to increase the operative diameter of the pulley. A state of equilibrium occurs at each instant, depending namely upon the load conditions of the vehicle, the speed, and the feeding of the motor.

Having described my invention, I claim:

1. In a motorcycle, having a rear driving wheel and a motor provided with an output shaft, the combination of a centrifugal clutch and an expanding pulley, said expanding pulley comprising two truncated conical axially movable flanges against which act centrifugal balls, said clutch comprising a rotating plate carrying a centrifugal mechanism and connected for rotation with the rear wheel through said expanding pulley, said clutch having an external drum, means for keying said drum to the output shaft, said clutch and pulley being mounted in juxtaposition on the output shaft of the motor, the external side of said rotating plate forming the bearing surface for the centrifugal balls which act against the adjacent flange of the expanding pulley.

2. The combination according to claim 1, in which the axially movable flanges of the pulley are provided with concentric driving sleeves, and in which the centrifugal clutch is provided with a hub forming an annular recess in which said sleeves are movable axially.

References Cited in the file of this patent

UNITED STATES PATENTS

| | | |
|---|---|---|
| 2,150,456 | Perrine | Mar. 14, 1939 |
| 2,512,816 | Sweger | June 27, 1950 |
| 2,521,457 | Heyer | Sept. 5, 1950 |
| 2,543,337 | Salsbury | Feb. 27, 1951 |